(12) United States Patent
Kuppuswamy et al.

(10) Patent No.: US 8,600,751 B2
(45) Date of Patent: Dec. 3, 2013

(54) DIGITAL METHOD AND ARRANGEMENT FOR AUTHENTICATING A PERSON

(75) Inventors: Raja Kuppuswamy, Munich (DE); Christian Pilz, München (DE)

(73) Assignee: Voice.Trust AG, Munich (DE)

( * ) Notice: Subject to any disclaimer, the term of this patent is extended or adjusted under 35 U.S.C. 154(b) by 628 days.

(21) Appl. No.: 12/530,883

(22) PCT Filed: Feb. 19, 2008
(Under 37 CFR 1.47)

(86) PCT No.: PCT/EP2008/052023
§ 371 (c)(1),
(2), (4) Date: Jul. 20, 2010

(87) PCT Pub. No.: WO2008/110441
PCT Pub. Date: Sep. 18, 2008

(65) Prior Publication Data
US 2012/0095763 A1    Apr. 19, 2012

(30) Foreign Application Priority Data
Mar. 12, 2007  (DE) .......................... 10 2007 011 831

(51) Int. Cl.
*G10L 15/00*  (2013.01)
(52) U.S. Cl.
USPC ............................ 704/246; 704/231; 704/247
(58) Field of Classification Search
USPC ......................................... 704/231, 246, 247
See application file for complete search history.

(56) References Cited

U.S. PATENT DOCUMENTS

| | | | |
|---|---|---|---|
| 4,989,248 A * | 1/1991 | Schalk et al. | 704/252 |
| 5,522,012 A * | 5/1996 | Mammone et al. | 704/250 |
| 6,510,415 B1 * | 1/2003 | Talmor et al. | 704/273 |
| 6,748,356 B1 * | 6/2004 | Beigi et al. | 704/245 |
| 6,973,426 B1 * | 12/2005 | Schier et al. | 704/246 |
| 7,054,817 B2 * | 5/2006 | Shao | 704/270 |
| 7,177,808 B2 * | 2/2007 | Yantorno et al. | 704/246 |
| 7,822,605 B2 * | 10/2010 | Zigel et al. | 704/246 |
| 7,937,269 B2 * | 5/2011 | Aggarwal et al. | 704/245 |
| 2004/0186724 A1 * | 9/2004 | Morin | 704/273 |
| 2006/0136219 A1 * | 6/2006 | Wang | 704/273 |
| 2006/0294390 A1 | 12/2006 | Navratil et al. | |

FOREIGN PATENT DOCUMENTS

WO    9823062    5/1998

OTHER PUBLICATIONS

Surendran, "Sequential Decisions for Faster and More Flexible Verification" Eurospeech, vol. 2 Sep. 2001; pp. 763-766.*
Joseph Attili, A TMS32020-Based Real Time, Text-independent, Automatic Speaker Verification System, IEEE: CH2561-9/88/0000-0599.*
Surendran, "Sequential Decisions for Faster and More Flexible Verification" Eurospeech, vol. 2 Sep. 2001 pp. 763-766.*
Surendran, Arun C. Sequential Decisions for Faster and More Flexible Verification, Multimedia Communications Research Lab, Bell Labs, Lucent Technologies, Eurospeech 2001—Scandinavia.

* cited by examiner

*Primary Examiner* — Douglas Godbold
*Assistant Examiner* — Ernest Estes
(74) *Attorney, Agent, or Firm* — Volpe and Koenig, P.C.

(57) ABSTRACT

Digital method for authentication of a person by comparing a current voice profile with a previously stored initial voice profile, wherein to determine the relevant voice profile the person speaks at least one speech sample into the system, this speech sample is conveyed to a voice-profile calculation unit and thereby, on the basis of a prespecified voice-profile algorithm, the voice profile is calculated, such that the overall size of the speech sample and/or parameters of its evaluation to determine the relevant voice profile are established dynamically and automatically as the sample is spoken, in response to the result of an evaluation of a first partial speech sample.

9 Claims, No Drawings

DIGITAL METHOD AND ARRANGEMENT FOR AUTHENTICATING A PERSON

BACKGROUND

The invention relates to a method for authentication of a person on the basis of the person's voice profile, as well as to a corresponding authentication arrangement.

Previously used methods of authenticating a person are based on checking whether the person is in possession of particular objects (traditionally, e.g., a seal or pass, recently also an admission card or token) or of individualised knowledge (e.g., PIN or password). Biometrically based authentication methods, on the other hand, make use of certain physical characteristics of the person, such as a fingerprint or retinal pattern, or a voice profile.

In recent years extensive work has been done to develop the last of these methods, which has already resulted in marketable products. In relation to these developments, considerable attention has been paid to the question of how useful "traces" of the person can be for authentication or even an initial registration (so-called enrollment), both with regard to the security of identification or authentication and with regard to user acceptance, i.e. the avoidance of long and elaborate procedures.

With methods of this generic kind an important aspect is the usefulness of the speech samples so obtained for registration or authentication of the user, and any resulting control influences upon the way the procedure is carried out. Of special significance for the practical acceptance and hence the commercial adoption of the methods concerned is that a level of security prespecified by the system user can be reliably achieved.

An additional object of the developments is therefore to establish measures that can be employed in case this degree of security is not achieved, because of problems that occur in practice with either the vocal material or implementation of the method. Such problems can reside, for instance, in the current physical and mental state of the speaker, in the presence of background noises and in a low quality of the transmission channel or of the device into which the speech sample is spoken.

SUMMARY

The objective of the present invention is thus to provide an improved method and a corresponding arrangement, with which a high degree of user-friendliness and -acceptance is advantageously combined with the fulfillment of high security requirements.

This objective is achieved in its methodological aspect by a method according to the invention, and with respect to the apparatus by an arrangement according to the invention. Advantageous further developments of the concept central to the invention are described below.

The invention incorporates the substantial idea that the speech sample in its entirety and/or parameters of its evaluation used to determine the voice profile in each case are established dynamically and automatically while the person is speaking, in response to the result of an evaluation of a first partial speech sample.

This makes it possible to decide dynamically, in quasi-real time, how much speech material enters into a voice-profile-based decision made by the authentication system within the framework of the algorithm or heuristic that is being employed.

An advantageous result is that the inconvenience to the speaker is minimized, in that only the absolutely essential speech input is demanded, and hence the duration of the authentication procedure is shortened. The ultimate consequence is an increase in user acceptance (with respect to the people required to employ the system). Furthermore, because of the dynamic implementation of the method, an optimization of the effectiveness/security of the verification and/or authentication mechanism is achieved.

DETAILED DESCRIPTION OF THE INVENTION

In a preferred way to implement the method it is provided that in response to the result of an evaluation of the first partial speech sample, within a predetermined sequence of user-guidance signals for the provision of several partial speech samples a termination marker is positioned, and presentation of the user guide is stopped at this point. This will take place when a part of the speech samples provided suffices for an evaluation such that the prespecified security level is reached.

Alternatively it is provided that in response to the result of an evaluation of the first partial speech sample, a user-guidance sequence for the display of several partial speech samples in real time is generated and output, or one of several previously stored user guides is selected and output. Thus insofar as the evaluation of the first partial speech sample indicates that it is insufficient to reach the prespecified security level, the procedure for including additional speech material is continued. This idea, like all the control sequences in response to the result of evaluation of a "first partial speech sample" described here, can also be applied to the system in a state following evaluation of a second or additional speech samples. That is, it can be advanced step by step from a first to a second and then, if necessary, to additional speech samples and corresponding partial evaluations, until an adequate evaluation result is obtained.

In another embodiment of the method it is provided that the evaluation comprises a determination of filter coefficients or similar parameters of an initial speech-sample processing, and the size of the speech sample and/or parameters of its evaluation are established in dependence on the filter coefficients thus determined. Furthermore, it can be provided that the evaluation comprises a measurement of transmission parameters of a channel through which the speech sample is transmitted, and the size of the speech sample and/or parameters of its evaluation are established in dependence on the transmission parameters thus obtained. Thus in particular this enables a suitable response to specific technical deficits, e.g. in the mouthpiece or transmission channel of the input device. In particular, by this means the size of the speech sample and/or parameters of its evaluation can be decided as a result of a comparative classification of the filter coefficients and/or transmission parameters.

An advantageous kind of evaluation of the first partial speech sample comprises a comparison of a preliminary current voice profile, calculated from the first (or first and second or first to third etc.) partial speech sample, with a stored initial voice profile, and the size of the speech sample and/or parameters of its evaluation are decided in dependence on the results of this comparison, in particular the degree of consistency that is found.

Insofar as the overall procedure includes the evaluation of several partial speech samples, in another embodiment it is provided that as parameter for the evaluation a weighting factor is set for the first partial speech sample and/or subsequent partial speech samples, for determination of the voice profile in each case. In particular, if the evaluation of the first partial speech sample has revealed fundamental deficits, in this process the weighting factor for the first partial speech sample can be set to zero, so that the determination of the relevant voice profile is begun again.

In the various embodiments of the method it can be desirable for the size of the speech sample and/or the parameters of its evaluation also to be specified in dependence on a predetermined confidence minimum of a recording or authentication sequence.

The particular embodiment of the arrangement, i.e. authentication system, in accordance with the invention results substantially from the above-mentioned embodiments of the method, and hence there will be no repetition of these aspects in the context of the arrangement. However, it is pointed out that the arrangement comprises as essential components a user-guidance control unit and/or an evaluation control unit, with which the voice-profile calculation is continued beyond a minimal configuration (with appropriate user guidance) and/or a suitable control of the evaluation process is implemented.

With regard to user guidance, one embodiment of the system provides that the user-guidance unit comprises a plurality of storage regions for storing components of a user guide and/or several predetermined guide sequences, and the user-guidance storage unit is designed for selectively accessing these storage regions and linking their contents to a user guide that can be output in response to a signal emitted from the voice-profile calculation unit, the result of an evaluation of a signal characterizing the first partial speech sample. The output signal of the voice-profile calculation unit thus addresses storage regions in which particular user-guide components are stored, and thereby brings about a continuation of the authentication procedure in accordance with the evaluation result.

With regard to the voice-profile calculation unit, an embodiment is provided in which the calculation unit comprises a unit for preprocessing a speech sample in order to determine filter coefficients or similar parameters of a speech sample spoken into the system, and the user-guidance control unit is connected on its input side with a filter-coefficient output of the speech-sample preprocessing unit. Alternatively or in combination therewith it can be provided that the voice-profile calculation unit comprises a speech-sample preprocessing unit designed to determine transmission parameters of a channel that transmits the speech sample, and the user-guidance control unit is connected on its input side with a transmission-parameter output of the speech-sample preprocessing unit.

A system configuration designed for practical implementation of verification and/or authentication processes comprises a voice-profile storage unit and, connected thereto as well as to the voice-profile calculation unit, a voice-profile comparison unit by means of which an initially produced voice profile is compared with a current voice profile, and a control signal is output to the user-guidance control unit or to the evaluation control unit according to the result of the comparison. The embodiment of the invention is not restricted to the aspects and actions described above, but rather is possible in a large number of modifications that are within the scope of a person skilled in the art.

The invention claimed is:

1. Digital method for authentication of a person by comparison of a current voice profile with a previously stored initial voice profile, comprising:

receiving speech from the person speaking into the system so as to provide at least one input speech sample to determine a relevant voice profile, conducting the input speech sample to a voice-profile calculation unit and thereby, on the basis of a predetermined voice-profile algorithm, calculating the current voice profile and determining at least one of an overall size of the speech sample or parameters of its evaluation that are necessary to authenticate the speaker dynamically and automatically while the input speech sample is being spoken into the system based on an evaluation of a first partial speech sample relative to a pre-specified security level, in order to establish the relevant voice profile, wherein as a parameter of the evaluation a weighting factor of at least one of the first partial speech sample or subsequent partial speech samples is established for determination of the associated voice profile, and the weighting factor for the first partial speech sample is set to zero, such that the determination of the voice profile in each case is started anew, and wherein a control signal is output to a user-guidance control unit based upon the comparison of an initially produced voice profile with a current voice profile.

2. Method according to claim 1, wherein the evaluation comprises a determination of filter coefficients or similar parameters of a speech-sample preprocessing, and at least one of the size of the speech sample or the parameters of its evaluation are established in dependence on the filter coefficients thus determined.

3. Method according to claim 1, wherein the evaluation comprises a determination of transmission parameters of a channel through which the speech sample is transmitted, and the at least one of the size of the speech sample or the parameters of its evaluation are established in dependence on the transmission parameters thus determined.

4. Method according to claim 2, wherein the at least one of the size of the speech sample or the parameters of its evaluation are decided as a result of a comparative classification of the filter coefficients and/or transmission parameters.

5. Method according to claim 1, wherein the evaluation comprises a comparative processing in which a preliminary current voice profile calculated from the first partial speech sample is compared with a stored initial voice profile, and the at least one of the size of the speech sample or the parameters of its evaluation are established in dependence on a result of this comparison.

6. Method according to claim 1, wherein the at least one of the size of the speech sample or the parameters of its evaluation are also established in dependence on a predetermined confidence minimum of a registration or authentication procedure.

7. Digital method for authentication of a person by comparison of a current voice profile with a previously stored initial voice profile, comprising the person speaking into the system so as to provide at least one input speech sample to determine a relevant voice profile, conducting the input speech sample to a voice-profile calculation unit and thereby, on the basis of a predetermined voice-profile algorithm, calculating the current voice profile and determining at least one of an overall size of the speech sample or parameters of its evaluation that are necessary to authenticate the speaker dynamically and automatically while the input speech sample is being spoken into the system based on an evaluation of a first partial speech sample relative to a pre-specified security level, in order to establish the relevant voice profile, wherein in response to the result of an evaluation of the first partial speech sample, a termination marker is positioned within a predetermined user-guide sequence in which several partial speech samples are provided, so that an output of the user guide is stopped when the termination marker is reached.

8. Digital method for authentication of a person by comparison of a current voice profile with a previously stored initial voice profile, comprising the person speaking into the system so as to provide at least one input speech sample to determine a relevant voice profile, conducting the input speech sample to a voice-profile calculation unit and thereby, on the basis of a predetermined voice-profile algorithm, calculating the current voice profile and determining at least one of an overall size of the speech sample or parameters of its evaluation that are necessary to authenticate the speaker dynamically and automatically while the input speech sample is being spoken into the system based on an evaluation of a first partial speech sample relative to a pre-specified security level, in order to establish the relevant voice profile, wherein in response to the result of an evaluation of the first partial speech sample, a user-guide sequence to display several partial speech samples is generated and output in real time.

9. Digital method for authentication of a person by comparison of a current voice profile with a previously stored initial voice profile, comprising the person speaking into the system so as to provide at least one input speech sample to determine a relevant voice profile, conducting the input speech sample to a voice-profile calculation unit and thereby, on the basis of a predetermined voice-profile algorithm, calculating the current voice profile and determining at least one of an overall size of the speech sample or parameters of its evaluation that are necessary to authenticate the speaker dynamically and automatically while the input speech sample is being spoken into the system based on an evaluation of a first partial speech sample relative to a pre-specified security level, in order to establish the relevant voice profile, wherein in response to the result of an evaluation of the first partial speech sample, one of several previously stored user-guide sequences is selected and output.

* * * * *